United States Patent Office 3,379,547
Patented Apr. 23, 1968

3,379,547
DEXTRIN
John W. Huebschmann, Decatur, and Gerald F. Bramel, Niantic, Ill., assignors to A. E. Staley Manufacturing Company, Decatur, Ill., a corporation of Delaware
No Drawing. Filed Sept. 2, 1965, Ser. No. 484,757
10 Claims. (Cl. 106—210)

ABSTRACT OF THE DISCLOSURE

Acid dextrinization of a composition comprising cereal starch and a formaldehyde source and sludge free adhesive compositions comprising said dextrin and borax.

This invention relates to a new method of preparing cereal starch dextrins and adhesive compositions comprising said dextrin and borax. More particularly, this invention relates to the acid dextrinization of a composition comprising cereal starch and a formaldehyde source and sludge free adhesive compositions comprising said dextrin and borax.

The so-called "white" dextrins (i.e. dextrins prepared by roasting starch with acid) are well known adhesives. It has been our experience that a sludge forms when cereal starch dextrins are heated in the presence of borax and other alkalies in an aqueous system. This sludge is undesirable since adhesive compositions which are sludge free, foamless, produce a smoother film, do not clog spray nozzles or screens and have better stability. In other words, sludge free dextrin borax pastes cause fewer production problems for adhesive users. We believe that this sludge is formed by the reaction of borax and protein impurities in cereal starch dextrins which is apparently borne out by the fact that no sludge is formed when root starch dextrins, which contain no protein, are employed.

Many of the large scale industrial adhesive users prefer to use well balanced adhesive compositions, which are activated by merely heating the composition with water to paste the dextrin without adding any additional ingredients. As is well known, starch and dextrin pastes tend to spoil in the absence of a preservative. Accordingly, it is usually desirable to dry blend an effective preservative into dextrin compositions. Unfortunately, the addition of relatively low cost effective preservatives, such as phenolics sold under the name "Dowicide," tends to increase the amount of sludge formed by cereal starch dextrins. On the other hand, when paraformaldehyde is employed as a preservative, the dextrin adhesive turns a pink color which is considered unacceptable by most users.

The object of this invention is to provide a new method of preparing cereal starch dextrins which does not form a sludge when heated in the presence of borax or other alkalies in an aqueous system, alone or together with phenolic preservatives. Other objects will become apparent hereafter.

We have now found that the objects of our invention can be attained by dextrinizing cereal starches under controlled conditions in the presence of formaldehyde source, such as formaldehyde or paraformaldehyde. Surprisingly, even when paraformaldehyde is employed, no pink color is formed when the dextrin is cooked with borax and alkali in an aqueous medium. Likewise, no sludge is formed even in the presence of a phenolic preservative. We believe that the formaldehyde reacts with the proteinaceous material in the cereal starch and prevents any subsequent reaction with borax in an aqueous medium. Unreacted formaldehyde and/or paraformaldehyde is apparently vaporized from the dextrinization chamber and, accordingly, is not present to form an undesirable pink color.

U.S. Patent 2,417,611 of Pierson discloses heating starch and formaldehyde at temperatures up to about 220° F. The object of this patent is to prepare starch products which will not burst, gelatinize or swell appreciably upon exposure to boiling water and aqueous alkali solutions. In other words, U.S. Patent 2,417,611 is directed to a process of preparing an inhibited starch and employs a higher concentration of formaldehyde than is employed in our invention. Such products are not suitable for use in our invention. U.S. Patent 2,396,937 is directed to a process of roasting a white corn dextrin with formaldehyde at temperatures in excess of 300° F. This patent indicates that if the acid, formaldehyde and a non-degraded starch rather than a dextrinized starch, are all mixed together and the conversion is carried out at relatively high temperatures on the order of 300° F., the resultant product becomes mushy in water but has no substantial adhesive properties. In other words, the starch is cross-linked during the heating step and becomes inhibited much like the product of U.S. Patent 2,417,611.

In contrast to the processes described in U.S. Patents 2,396,937 and 2,417,611, undegraded granular cereal starch is roasted in our invention with formaldehyde under conditions where the formaldehyde does not cross-link the cereal starch but combines with the protein in the cereal starch. The cereal starch composition contains about 0.025 to 0.75 part by weight active formaldehyde per each 100 parts by weight starch on a dry solids basis. When too little formaldehyde is used, the borax-cereal starch dextrin paste forms a sludge. Above about 0.75 part by weight formaldehyde, there is a tendency to form cross-linked products. Inasmuch as the amount of protein in cereal starches varies from one variety to another (e.g. wheat starch has more protein than corn starch) the most advantageous concentration of formaldehyde is dependent on the cereal starch used. For example, with corn starch best results have been obtained using 0.05 to 0.20 part by weight formaldehyde per each 100 parts by weight corn starch. Suitable sources of formaldehyde include "Formalin" (37% by weight aqueous formaldehyde), paraformaldehyde, trioxane, etc.

Suitable acids for use in our invention are strong mineral acids such as hydrochloric acid, sulfuric acid and nitric acid. Hydrochloric acid is preferred. The strong oxidizing acids, such as nitric acid, are less desirable since they tend to yield somewhat darker products. The acid can be used in a concentration of from about 0.01 to 1.0 part by weight per each 100 parts by weight cereal starch on a dry solids basis.

The acid and formaldehyde are added individually or together to the granular starch and blended to form a uniform mixture. One convenient method of operation comprises forming an aqueous solution of acid and formaldehyde and spraying the solution onto the starch.

The granular cereal starch, acid and formaldehyde are heated in a sealed vented chamber at a temperature of about 230 to 330° F. for about 15 to 120 minutes. Preferably, the product is roasted at a temperature of 230 to 280° F. If heating is continued for more than about 120 minutes, the product tends to become inhibited and will not paste sufficiently in an aqueous alkaline medium containing borax to form a suitable adhesive.

After the cereal starch composition is dextrinized in the above manner, it is neutralized to a pH of about 3.5 to 6 with a dry basic material such as ammonium bicarbonate. The neutralized material can be shipped or, as is generally preferred, dry blended with the other components of the final adhesive composition. Normally sufficient borax and/or alkali metaborate (mixture of borax and alkali metal hydroxide) is added to the cereal starch dextrin in a concentration sufficient to comprise from about 5 to 25% by weight of the adhesive. Stated another way, the cereal starch dextrin (on an as is basis) comprises about 75 to 95% by weight of the composition.

Small amounts of phenolic preservatives and/or a bleach such as sodium bisulfite can each be added in concentrations of about 0.01 to 1.0 part of cereal starch dextrin-borax composition. The bisulfite also tends to react with unreacted formaldehyde.

The following examples are merely illustrative and should not be construed as limiting the scope of this invention. In the examples "parts" refers to "parts by weight."

Example 1

One and six-tenths parts by weight of 22° Bé. muriatic acid and 2.0 parts by weight of Formalin (37% aqueous formaldehyde) were mixed together and then sprayed onto 800 parts by weight of granular cereal starch and mixed well together. The composition was added to a dextrin cooker and roasted at 250° F. for approximately one hour. Then 4.5 parts of ammonium bicarbonate was added to neutralize the reactants.

Seven hundred parts of the cereal starch dextrin, 75.5 parts of sodium metaborate, 41.2 parts borax, 2.5 parts surface active agent, 3.3 parts Dowicide G and 3.3 parts sodium bisulfite were mixed together.

One hundred twenty grams of the adhesive formulated in the preceding paragraph was heated to a temperature of 190° F. in 200 grams of distilled water and maintained at this temperature for one hour. The cooked paste contained no sludge.

When this example was repeated except that no formaldehyde was present during the roasting step, the adhesive composition had a sizable concentration of sludge.

When this example was repeated except that no formaldehyde was included in the roasting step and the Dowicide G was replaced with an equal concentration of paraformaldehyde, the adhesive had a pink color.

Example 2

Example 1 was repeated with essentially the same results except that 0.74 part by weight of paraformaldehyde was used in place of 2.0 parts of Formalin. The final adhesive composition did not form a sludge and did not have a pink color.

Example 3

Essentially the same results are obtained by replacing the granular corn starch in Example 1 with granular wheat starch and increasing the Formalin concentration to about 6.0 parts by weight.

Since many embodiments may be made of this invention, and since many changes may be made in the embodiments described, the foregoing is to be interpreted as illustrative only, and the invention is defined by the claims following hereafter.

We claim:
1. The process of preparing a cereal starch dextrin which comprises roasting a composition comprising a granular cereal starch, from about 0.025 to 0.75 part by weight of formaldehyde per each 100 parts by weight of cereal starch and about 0.01 to 1.0 part by weight strong mineral acid per each 100 parts by weight of cereal starch at a temperature of about 230 to 330° F. and time sufficient to form a cereal starch dextrin capable of pasting in aqueous alkali with borax to form a sludge free adhesive.

2. The process of preparing a cereal starch dextrin which comprises roasting up to about 120 minutes a composition comprising a granular cereal starch, from about 0.025 to 0.75 part by weight of formaldehyde per each 100 parts by weight of cereal starch and about 0.01 to 1.0 part by weight strong mineral acid per each 100 parts by weight of cereal starch at a temperature of about 230 to 330° F. to form a cereal starch dextrin capable of pasting in aqueous alkali with borax to form a sludge free adhesive.

3. The process according to claim 2, wherein said roasting is carried out for from 15 to 120 minutes.

4. The process according to claim 2, wherein said cereal starch comprises corn starch.

5. The process of preparing a corn starch dextrin which comprises roasting up to about 120 minutes a composition comprising granular corn starch, from about 0.05 to 0.20 part by weight formaldehyde per each 100 parts by weight corn starch and about 0.01 to 1.0 part by weight strong mineral acid per each 100 parts by weight of corn starch at a temperature of about 230 to 330° F. to form a cereal starch dextrin capable of pasting in aqueous alkali with borax to form a sludge free adhesive.

6. The process of claim 5 wherein the formaldehyde is aqueous formaldehyde.

7. The method of claim 5 wherein the formaldehyde is paraformaldehyde.

8. An adhesive composition which is capable of forming a sludge free paste comprising borax and cereal starch dextrin prepared by roasting at about 230° to 330° F. a cereal starch with about 0.025 to 0.75 part of formaldehyde per each 100 parts by weight of cereal starch and 0.01 to 1.0 part by weight strong mineral acid per each 100 parts by weight cereal starch.

9. An adhesive composition which is capable of forming a sludge free paste comprising from about 5 to 25 parts by weight of a material selected from the groups consisting of borax, alkali metaborate and mixtures thereof with from about 95 to 75 parts by weight of cereal starch dextrin prepared by roasting at a temperature of about 230 to 330° F. a cereal starch with from about 0.025 to 0.75 part by weight of formaldehyde per each 100 parts by weight of cereal starch and 0.01 to 1.0 part by weight of a strong mineral acid per each 100 parts by weight of cereal starch.

10. The composition of claim 9 wherein said cereal starch comprises corn starch.

References Cited

UNITED STATES PATENTS

| | | | |
|---|---|---|---|
| 2,417,611 | 3/1947 | Pierson | 106—210 X |
| 2,443,290 | 6/1948 | Bauer | 106—210 X |
| 2,772,178 | 11/1956 | Kunze | 106—208 |

ALEXANDER H. BRODMERKEL, *Primary Examiner.*

T. MORRIS, *Assistant Examiner.*